(12) United States Patent
Henriet et al.

(10) Patent No.: US 8,784,091 B2
(45) Date of Patent: Jul. 22, 2014

(54) CO-EXTRUSION OF FOOD MATERIAL AND PRODUCT RESULTING THEREOF

(75) Inventors: Marc Stephane Henriet, Sainte Eusoye (FR); Bernard Alain Daouse, Noailles (FR)

(73) Assignee: Nestec S.A., Vevey (CH)

( * ) Notice: Subject to any disclaimer, the term of this patent is extended or adjusted under 35 U.S.C. 154(b) by 695 days.

(21) Appl. No.: 12/679,438

(22) PCT Filed: Sep. 15, 2008

(86) PCT No.: PCT/EP2008/062230
§ 371 (c)(1),
(2), (4) Date: Mar. 22, 2010

(87) PCT Pub. No.: WO2009/037221
PCT Pub. Date: Mar. 26, 2009

(65) Prior Publication Data
US 2010/0209562 A1 Aug. 19, 2010

(30) Foreign Application Priority Data
Sep. 21, 2007 (EP) .................................. 07117004

(51) Int. Cl.
| | | |
|---|---|---|
| B29C 47/30 | (2006.01) | |
| A23L 1/00 | (2006.01) | |
| A23G 9/24 | (2006.01) | |
| A23G 3/54 | (2006.01) | |
| A23G 3/20 | (2006.01) | |
| A23P 1/12 | (2006.01) | |
| A23G 9/28 | (2006.01) | |
| A23G 9/48 | (2006.01) | |
| A23G 3/34 | (2006.01) | |

(52) U.S. Cl.
CPC ............... *A23P 1/125* (2013.01); *A23L 1/0079* (2013.01); *A23G 9/24* (2013.01); *A23G 3/54* (2013.01); *A23G 3/203* (2013.01); *A23L 1/0005* (2013.01); *A23G 9/282* (2013.01); *A23G 9/48* (2013.01); *A23G 3/0068* (2013.01)
USPC ........................ 425/381; 425/382 R; 425/463

(58) Field of Classification Search
CPC .... A21C 9/04; B29C 47/065; B29C 47/0816; B29C 47/122; B29C 47/128
USPC ...................................... 425/381, 382 R, 463
See application file for complete search history.

(56) References Cited

U.S. PATENT DOCUMENTS

| | | | |
|---|---|---|---|
| 4,469,475 | A | 9/1984 | Krysiak |
| 4,900,572 | A | 2/1990 | Repholz et al. |
| 2004/0081733 | A1 | 4/2004 | Buter et al. |
| 2005/0233033 | A1 | 10/2005 | Marchon et al. |
| 2005/0260317 | A1 | 11/2005 | Cotten et al. |
| 2006/0051458 | A1 | 3/2006 | Fornaguera |

FOREIGN PATENT DOCUMENTS

| | | |
|---|---|---|
| DE | 2227531 | 12/1972 |
| EP | 189299 | 7/1986 |
| EP | 741972 | 11/1996 |
| WO | WO 00/60959 | 10/2000 |

OTHER PUBLICATIONS

Written Opinion, PCT/EP2008/062230, Nov. 20, 2008.
International Search Report, PCT/EP2008/062230, Nov. 20, 2008.

*Primary Examiner* — James Sanders
(74) *Attorney, Agent, or Firm* — K&L Gates LLP

(57) ABSTRACT

The invention proposes a system for dosing a food product onto an object comprising a dosing device (1) for co-extrusion of at least 2 food materials at the same time to form a multi-component food product (30), said dosing device (1) comprising a core element (2) housing at least a first and a second supply (5a, 5b), said first supply (5a) having at least one orifice (6) connected to an extrusion channel (7) which is positioned coaxially to an extrusion channel (8) of the second supply (5b), and a cylindrical tube element (3) relatively rotatable to and enclosing the core element (2), having at least one aperture (3a), wherein said aperture (3a) is designed to be selectively brought into a coaxial position to the extrusion channels (8,7) of the first and second supplies (5a, 5b) by rotating the cylindrical tube element (3), allowing a co-extrusion of the food materials introduced into the supplies (5a, 5b) of the core element. The invention further relates to a method for co-extrusion of at least two extrudable food products using the described apparatus and a product resulting thereof.

24 Claims, 3 Drawing Sheets

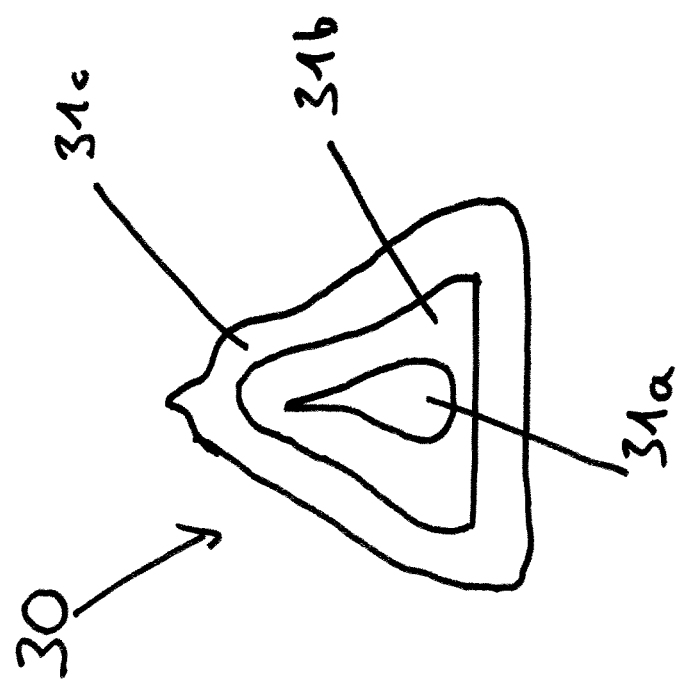

US 8,784,091 B2

CO-EXTRUSION OF FOOD MATERIAL AND PRODUCT RESULTING THEREOF

BACKGROUND OF THE INVENTION

Field of the Invention

The present invention relates to a device and a method for continuously dosing a food material onto a support e.g. a tray, a conveyor belt or another food product. More particularly the invention relates to such a dosing device which is designed to make double, triple or more co-extrusions of liquid/semi-liquid food products such as aerated frozen confections onto a support. The invention further relates to novel multi-component food products such as filled aerated frozen desserts resulting thereof.

Aerated frozen confections within the meaning of the invention include but are not limited to ice creams, sorbets, sherbets, water ices, frozen yoghurts and Mellorine.

Devices for extruding food material such as ice cream have been developed for providing the market with a variety of food products in different shapes and pattern.

US 2004/0081733 A1 relates for example to a process for division and extrusion of ice cream flows from a nozzle.

The method disclosed in this patent refers to delivering a plurality of ice cream flows to a nozzle, wherein one or more of said ice cream flows are divided into a plurality of additional flows within said nozzle before the extrusion of said flows, thereby obtaining a particular form of the ice cream product.

Co-extrusion processes are also part of the prior art. These known methods allow the preparation of multi-layered food products. However, they do not allow the preparation of multi-component products wherein one of the components is fully included into the other one. Furthermore the known equipments usually need the presence of knifes to cut the extruded products into individual portions.

EP 0741972 A1 relates to an apparatus and method for dosing a pattern of food material onto an object moved continuously relative to the apparatus and to a method for dosing a pattern of food material onto such a moving object. The apparatus and method disclosed in this patent enable dosing a pattern of food material onto an object, like a tray or another foodstuff for instance for decoration purposes. The products obtained with such apparatus are limited in terms of their shape, in particular due to the pattern defined by the openings on the tube element forming e.g. a rectangular border. Moreover, the described system is not continuous and requires multiple start/stop procedures. Finally the product producible by such a method is limited to only one component.

In view of the prior art, there is a need for a process that would allow a sauce-like filling to be introduced into aerated frozen confection products in order to obtain an added value in so called multi-bite products.

Therefore, a method for the preparation of the advantageous combination of aerated frozen confection and sauce is sought-after in order to provide products with premium aspects and with the advantage to mix different textures (chocolate cracking, liquid sauce, smoothness of the aerated frozen confection . . . ) and flavours (with aerated frozen confection and sauce surrounded of a chocolate coating for example).

It is particularly desirable to provide a method for producing such a product in which the inner part such as a liquid, sauce or aerated frozen confection is fully included in the outer part such as an aerated frozen confection, in order to enclose the filling completely. Especially when a liquid filling is enclosed, it is desired to avoid sauce at the lower or top side of the product. Furthermore, it is desirable to produce such a product at high capacity.

The present invention seeks to address the problem of providing a dosing system for co-extruding at least two types of food material such as e.g. aerated frozen confection and sauce onto a support, in order to obtain a multi-layer product with the above described advantages.

OBJECT AND SUMMARY OF THE INVENTION

In a first aspect, the invention proposes a system for continuously dosing a food product onto a support, the system comprising a dosing device for co-extrusion of at least two food materials such as sauce and aerated frozen confection at the same time to form a multi-component food product, said dosing device comprising a static core element housing at least a first and a second supply, said first supply having at least one orifice connected to an extrusion channel which is positioned coaxially to an extrusion channel of the second supply, and a cylindrical tube element relatively rotatable to and enclosing the core element, having at least one aperture, wherein said aperture is designed to be selectively brought into a coaxial position to the extrusion channels of the first and second supplies by rotating the cylindrical tube element, allowing a co-extrusion of the food materials introduced into the supplies of the core element.

In further production process, the co-extruded food products can be frozen, and can be coated with other materials such as a fat based coating.

With this dosing device, it is possible to co-extrude two food products such as e.g. aerated frozen confection and sauce, or two different or equal types of aerated frozen confection, at the same time. Once one of the apertures of the rotary body, which is preferably of stainless steel, is aligned with the at least two co-extrusion channels, the frozen food product e.g. a miniature is dosed and the cut is created due to the rotation. Thereby, the rotation of the tube element may be performed continuously or intermittently.

It is an advantage of such device that the food product provided to the first supply of the core element, preferably a liquid such as a sauce, will be included in the food product provided to the second supply e.g. an aerated frozen confection in such a way that liquid is avoided at the lower or top side of the product and is also not bleeding from the coated aerated frozen confection. This means that the inner food product which is formed by the extrusion channel connected to the first supply is completely enclosed by the food product formed by the extrusion channel of the second supply, in comparison to products from different technologies. This is an improvement compared with currently commercial products produced by cutting a rope of co-extruded aerated frozen confection and sauce. Of course, the inner filling which is provided by the first supply may as well be another food product such as an aerated frozen confection.

In addition, it is possible to produce very small food products with a volume size between 2 and 25 milliliters. Thereby, an inner liquid or sauce can be provided even in these miniature food products.

Another advantage of this device is that multi-flavoured and/or multi-component (e.g. contrast of texture and flavours) aerated frozen confection products such as aerated frozen confection miniatures can be produced at high capacity.

Furthermore, the tube element can easily be changed and thus different shapes and designs of the dosed food can be obtained by applying another tube element with different apertures for example.

It should be understood that the current invention is not limited to the co-extrusion of the above described products and hence can also be used for dosing other food products than aerated frozen confection. As non-limiting examples, aerated or texturized products such as yoghurts or mousses, fruit or vegetable-based purees, confectioneries can be prepared according to the method of the present invention. Furthermore, a plurality of extrusion channels can be connected to the first or second supply in order to obtain multiple production lanes which can be used for co-extruding food products.

Of course, a third supply (or even more supplies) and at least one third extrusion channel connected to said supply may be provided within the core element in order to enable a triple co-extrusion of an extrudable food product. It is also possible to perform more co-extrusions, depending on the number of supplies and extrusion channels housed by the core element. Thus, such a device according to the present invention is very convenient as much less space is occupied by it on a production line and the maintenance of the device is facilitated.

The supplies housed by the core element may have different designs. Preferably the supplies are co-parallel to the longitudinal axis of the core element. They may however vary in length and diameter in order to meet the requirements regarding space and pressure within the supplies. It is of course also possible to arrange the supplies in another pattern as described above.

The outlet of the extrusion channels is spaced at a distance from the surface of the core element. This is to enable the co-extrusion of the food products. Also, it is ensured that the inner liquid product within the first extrusion channel is fully coated by the outer food product formed by the product provided by the second extrusion channel.

The extrusion channels are preferably of stainless steel and are connected to the orifices of the supplies housed by the core element in a detachable manner.

The cylindrical tube element is equipped with apertures preferably distributed over the circumference of the tube element. These apertures can be brought into a coaxial position to and hence can be selectively aligned with the outlet of the extrusion channels. This feature enables a high-speed manufacturing process as during one rotation of said tube element a plurality of food products can be dosed according to the number of circumferential apertures of the tube element. Thereby, the diameter of said apertures is not fixed and can be varied for each aperture in order to obtain different shapes and portion sizes of the co-extruded food product.

Furthermore, each aperture of the cylindrical tube element may be equipped with an additional part such as a nozzle (in the following referred to as nozzle). The design can vary for each nozzle connected to the tube element in order to obtain different appearances and shapes of the food product, e.g. meringue shaped, by using different nozzles shapes and nozzle teeth. Thus, a hand-made look of the co-extruded product may be obtained. Also, the size of the co-extruded products can be varied by using nozzles of different sizes and diameters, e.g. from one to multi-bite size.

It should be understood that the nozzles and/or nozzle teeth may as well be integrally formed within the tube element.

The dosing system according to the first aspect of the invention further comprises supply means (e.g. pumps) connected to the supplies of the core element in order to provide food product flows to the core element. To obtain a minimum product flow rate, pressure is built up inside the supplies of the core element using said supply means. Hence, a good weight repartition among each of the extrusion channels connected to the same supply can be attained. Preferably, one supply means is connected to one supply of the core element in order to control the product flow rate for each supply separately. Thereby, controlling means enable the specific adjustment of the product flow rate within each of the supplies by regulating the parameters of the supply means.

Further, the system comprises a support which can be static or movable relatively to the dosing device. Thereby, a plurality of production lines can be dosed onto the support, depending on the number of extrusion channels and apertures of the tube element along the longitudinal axis of the dosing device.

The support can be a conveyor means, a tray, a moulding surface or another food product e.g. a cake or an aerated frozen confection wafer to be decorated. The support can be moved continuously or intermittently.

In case the support is a conveyer means, the surface of said conveyor means is preferably flat and chilled. Hence, a transportation of the co-extruded food product is provided in order to freeze the products and coat them with a fat based coating.

The support is preferably spaced at a certain distance from the dosing device in order to obtain certain portion sizes and desired shapes of the dosed food product.

The system is also provided with rotating means for the rotation of the cylindrical tube element about its longitudinal axis. Thereby, rotation of the tube element may be performed continuously or intermittently and the speed of rotation can be adjusted to meet different requirements regarding the co-extrusion process.

In a second aspect, the invention provides a method for the co-extrusion of frozen dessert onto an object, said method comprising the steps of supplying and controlling the food product flows to at least a first and second supply of a core element, and selectively starting and stopping the co-extrusion process by selectively rotating a cylindrical tube element having at least one aperture which can be aligned with coaxial extrusion channels provided to the first and second supply.

It is also possible to perform a triple or even more co-extrusion by supplying and controlling the food product flows to at least the first, second and third supply of the core element.

The advantage of this method is that only one step is needed to produce an aerated frozen confection product having at least two components.

Further, no special cutting device is needed within this manufacture process as the cutting of the product flows is performed by the rotation of the cylindrical tube element.

In a third aspect, the invention relates to a novel aerated frozen confection product producible by the above described method and device. The product obtained by the method of co-extrusion thus has for example a heart of sauce or aerated frozen confection completely surrounded by another food product such as aerated frozen confection.

The product obtained may as well consist of three or more different components producible by a process of triple or even more co-extrusion.

BRIEF DESCRIPTION OF THE DRAWINGS

Further features, advantages and objects of the present invention will become evident for the skilled person when reading the following detailed description of embodiments of the present invention, when taken in conjunction with the figures of the enclosed drawings.

FIG. 3 shows an example of a food product e.g. an aerated frozen confection product producible by the device and method for co-extrusion of a food product

DETAILED DESCRIPTION OF EMBODIMENTS

Figure 1:
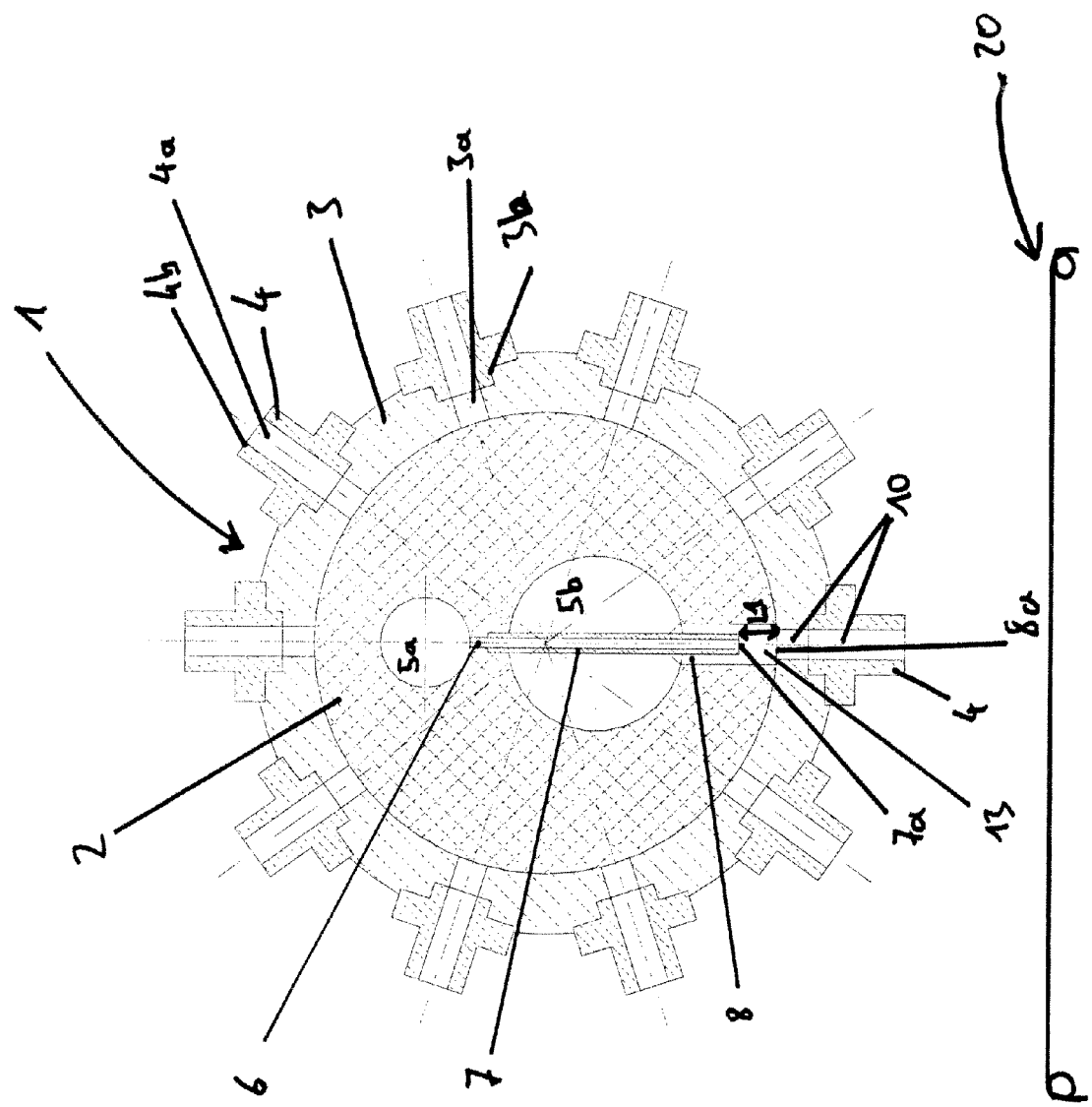
FIG. 1 shows a cross sectional area of a first embodiment of the device for co-extrusion of a food product.
Figure 2:
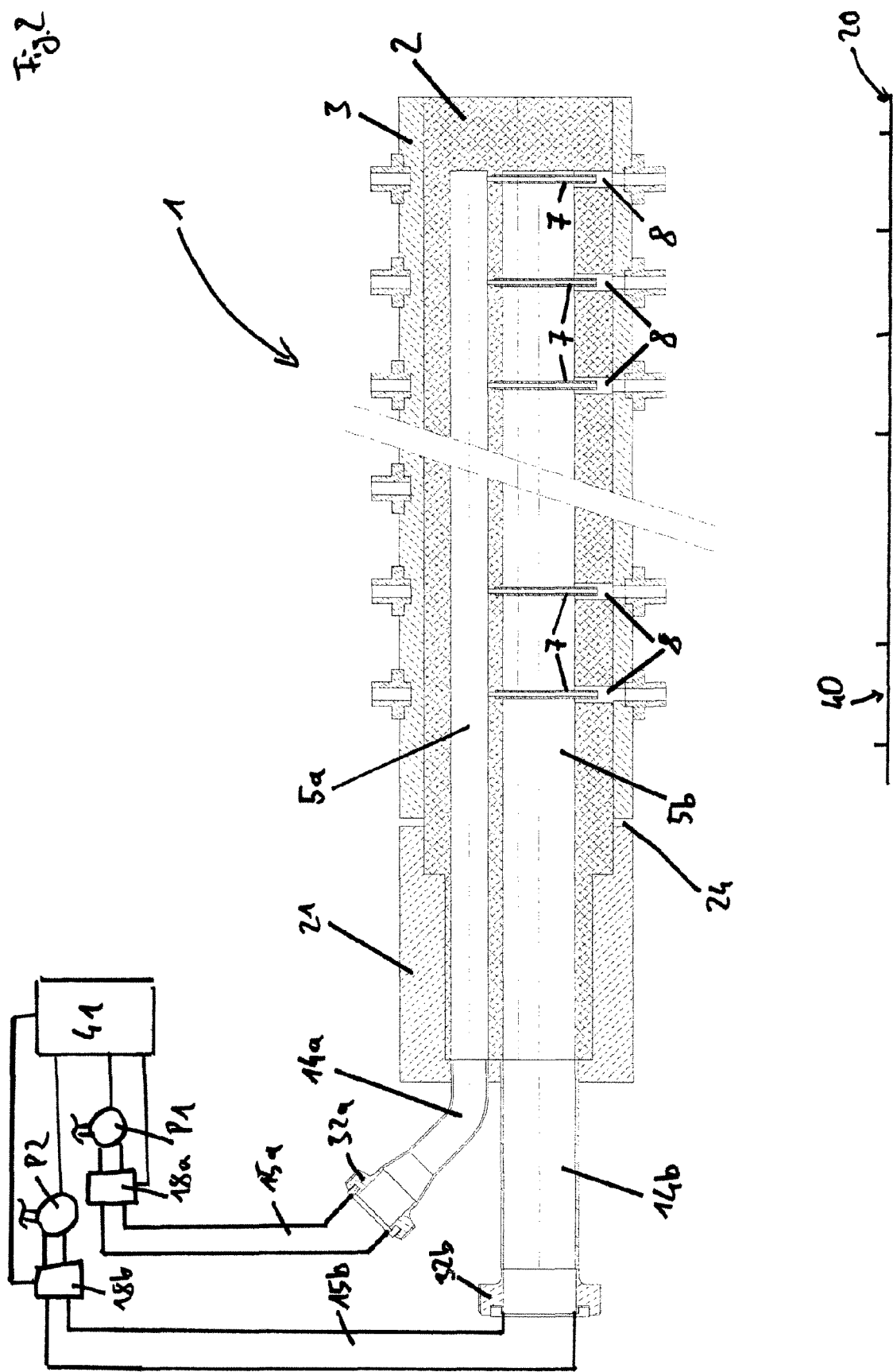
FIG. 2 is a sectional view of a first embodiment of the device for co-extrusion of a food product when taken along a vertical plane through the longitudinal axis of the dosing device.

FIG. 1 is a cross sectional view of a preferred embodiment of the dosing device 1 comprising a static core element 2, a cylindrical tube element 3 and a plurality of nozzles 4. The core element, which is preferably of a plastic material, houses two supplies 5a, 5b. The two supplies 5a, 5b may differ in diameter and are preferably arranged co-parallel to the longitudinal axis of the core element 2 as illustrated in FIG. 2. The supplies 5a, 5b may as well be arranged at any other pattern within the core element 2 which differs from that shown in the figures.

The cylindrical tube element 3 is rotatably mounted on the core element 2 and has a plurality of preferably cylindrical recesses 3b and apertures 3a which are preferably distributed over the circumference of the tube element 3.

The cylindrical tube element 3 is preferably of stainless steal.

The recesses 3b and apertures 3a of the tube element 3 are arranged coaxially to each other. It should be understood that the number of the recesses 3b and apertures 3a can differ from the quantity and position shown in the figures. Also, the width or the diameter of each of the apertures 3a can vary in order to vary the appearance of the dosed food product 30.

To each of the recesses 3b an additional part 4 such as a nozzle is connected in a detachable manner. Thus, the nozzles 4 can be exchanged and switched effortlessly. Thereby, the aperture 3a is coaxially aligned with the opening 4a of the nozzle such that a channel 10 is formed. Preferably, the apertures 3a and the openings 4a have the same diameter. The diameter of the opening 4a and the aperture 3a may vary for each nozzle 4 in order to vary the appearance and the portion size of the dosed food product 30.

Further, it is also possible that the cross sections of the openings 4a of the nozzles 4 have different geometrical shapes such as triangular or squared. Thus, food products of different geometrical shapes can be obtained.

The outlet 4b of the nozzles 4 may be equipped with teeth which are not shown in the figures. The teeth project towards the centre axis of the opening 4a of the nozzles 4 and/or in the direction of the food product flow dosed by the dosing device 1. Thus, different designs of the product 30 such as a handmade appearance can be obtained.

The design of the teeth may as well vary for each nozzle 4 in order to vary the appearance of the dosed food product 30.

Furthermore, instead of the described two-part design, the nozzles 4 can be integrally formed within the tube element 3 in order to obtain only one single rotatable part within the dosing device 1.

The first supply 5a of the core element 2 is connected to an orifice 6 which is coaxially connected to an extrusion channel 7. The extrusion channel 7 is preferably of stainless steal. The orifice 6 and the extrusion channel 7 are positioned at a preferably right-angle to the longitudinal axis of the supplies 5a and 5b.

The extrusion channel 7 is connected to the orifice 6 in a detachable manner and is therefore exchangeable. It is thus possible to connect different extrusion channels of different diameters and lengths to the orifice 6. Further, cover means e.g. a plug may be connected to the orifice 6. Thus, the orifice 6 can be closed in order to prevent the food product provided to the supply 5b from entering the supply 5a. In addition, the food product provided to the supply 5a can be prevented from entering the supply 5b.

The second supply 5b is connected to an extrusion channel 8. The extrusion channel 8 is coaxial to the extrusion channel 7 connected to the first supply 5a.

The extrusion channels 7 and 8 differ in diameter. The diameter of the extrusion channels 7 and 8 can be adapted to the viscosity or the flow rate of the food products supplied to the dosing device 1.

The outlet 7a of the extrusion channel 7 is spaced at a distance L1 from the outlet 8a of the extrusion channel 8. Referring to FIG. 1, the outlet 8a of the extrusion channel 8 coincides with the surface of the core element 2. Thus, the outlet 7a of the extrusion channel 7 is spaced at a distance L1 from the outlet 8a of the extrusion channel 8, respectively from the surface of the core element 2.

The length of said distance L1 is preferably at least 1 mm. Thus, the outlet 7a of said extrusion channel 7 is spaced at a distance of at least 1 mm from the surface of the core element 2. Hence, an undesired mixture of the product flows provided by the supplies 5a and 5b within an area 13 can be avoided.

Further, the distance L1 is preferably not longer than the length of the extrusion channel 8. Accordingly, it can be prevented that a food product supplied by the extrusion channels 7 enters the supply 5b.

In addition, it is possible to control the product flow within the extrusion channels 7 and 8 in order to enable a full inclusion of the food product provided by the supply 5a within the food product provided by the supply 5b.

When starting the co-extrusion process, the product flow within the supply 5a is started at the same time or preferably before the product flow within the supply 5b. Thus, the food product flow supplied by the extrusion channels 7 enters the area 13 at the same time or preferably before the food product flow provided by the extrusion channels 8. This delay in product flow is in order to prevent the food product flow provided to the supply 5b from entering the extrusion channels 7 or the supply 5a.

The extrusion channels 7 and 8 may be covered with a coating such as insulation. The insulation may not be necessary as long it is ensured that the freezing point of at least one of the food products provided to the supplies 5a or 5b is depressed. Accordingly, the freezing of the food product can be prevented and hence the product will not plug the device 1. For this purpose, a freezing point depressor such as sugar, alcohol or the like can be added to the food products to be dosed with the device 1.

The food product flow provided by the outlet of the first extrusion channel 7 is combined with the food product flow of the second extrusion channel 8 within an area 13 which can be connected to the channel 10 of the nozzle 4. Hence, the co-extrusion of the two food products is enabled when the tube element 3 is rotated such that the nozzle 4 is aligned with the extrusion channels 7 and 8. Thus, the food product introduced to the extrusion channels 7 and 8 is combined to form one product flow in area 13. Hence the combined product flow is discharged through the aligned channel 10 of the nozzle 4 onto a support beneath the dosing device 1.

Thereby, the dosed food product is portioned by rotating the tube element 3 by a rotating means with respect to the core element 2. Thus, it is possible to cut the product flow at the outlet of the extrusion channel 8. The rotating means is not shown in the figures.

In further production process, the co-extruded food products can be frozen, and can be coated with other materials such as a fat based coating.

The support which the product is dosed onto can be static or relatively movable to the device 1. Thereby, the motion of the support may be performed continuously or intermittently.

Further, the support can comprise conveyor means or an object. The object can be a tray, a moulding surface or another food product.

Thus, it is possible to dose the food product onto a flat surface of a conveyor means. The surface may as well be chilled. In addition, food products can be decorated with the product dosed from the device 1.

Further, the support is arranged at a certain distance from the outlet 4b of the nozzle 4. Preferably, the distance between the outlet 4b and the application surface of a support onto which the product is dosed is less than 15 centimeters.

The distance may be varied dependent on the flow rate of the food products to be co-extruded and/or the preferred size and desired shape of the product to be dosed.

FIG. 2 shows the dosing system according to a preferred embodiment of the invention comprising the dosing device 1, the delivering means P1, P2, 14a, 14b, 15a, 15b, 18a, 18b controlling means 41 and conveyor means 20.

The delivering means comprise connection means 14a, 14b, 15a, 15b e.g. tubes or hoses which are connected to the supplies 5a, 5b. In order to facilitate the assembly and maintenance, these connection means are connected by releasable connection devices 32a, 32b e.g. hose clamps.

Further supply means e.g. pumps P1, P2 are connected to the device 1 by connection means 14a, 14b, 15a, 15b, 32a, 32b.

The supply means may also comprise any other device for building up pressure within the connection means 14a, 14b, 15a, 15b and the supplies 5a, 5b within the core element. Thus, any means which actively pushes the product flow into the connection means 14a, 14b, 15a, 15b may be used as supply means.

Valves 18a, 18b may as well be connected to the connection means 15a, 15b and to the supply means P1, P2. For adjusting the pressure and hence the food product flow rate within the supplies 5a and 5b, control means 41, are connected to the supply means P1, P2 and to the valves 18a, 18b. Preferably, an adjustment can be made for each supply means P1, P2 and each valve 18a, 18b. Thus, it is possible to adjust the pressure and flow rate within the supplies 5a, 5b of the core element. Hence, undesired mixing of the product flows within the chamber 13 can be avoided.

As described above, the core element 2 remains static whereas the tube element 3 can be rotated about the longitudinal axis of the core element 2. Thereby, the tube element 3 is in tight contact with the core element 2. Preferably, there is no play present between the tube element 3 and the core element 2. Since the tube element 3 is preferably of plastic material, no bearings are needed to enable a smooth rotation.

Sealing means (not shown) may be provided between the core element 2 and the tube element 3, e.g. O-rings or the like. Thus, an efficient sealing of the dosing device can be obtained.

The ending of the core element 2 which is equipped with the connection means 14a, 14b is housed by a non-rotative part 21 which may be connected to holding means.

Between the non-rotative part 21 and the cylindrical tube element 3 a space 24 is provided. Thus, a contact of the tube element 3 and the non-rotative part 21 can be prevented.

Furthermore, driving means (not shown) are connected to the tube element. It is hence possible to enable and control the rotation of the tube element 3 with respect to the core element 2.

As shown in this figure, a plurality of extrusion channels 7, 8 can be connected to each of the supplies 5a, 5b. Thus, it is possible to perform multiple co-extrusions at the same time, depending on the quantity of extrusion channels 7, 8. When the nozzles 4 are aligned with the extrusion channels 7, 8, multiple food products 30 can be dosed onto a support such as a conveyor belt 20. Thus, multiple production lines 40 of the food product 30 are formed. Due to the rotative embodiment of the tube element 3, the food products can be produced at high speed, compared to other alternative movements.

As shown in the figure, the connections means 14a, 14b, 15a, 15b are both connected to the supplies 5a, 5b at the left side of the core element 2. However, the connection means 14a, 14b, 15a, 15b may as well be connected to the supplies 5a, 5b at the opposite side of the core element 2. It may also be possible to connect each of the supplies 5a, 5b to connection means on different sides of the core element 2.

FIG. 3 shows an aerated frozen confection product 30 producible by the above described method and device. The product obtained by the method of co-extrusion thus has a heart of sauce 31a completely surrounded by at least one additional component 31b, 31c such as aerated frozen confection. It should be understood that no bleeding of the sauce occurs and thus no sauce appears at the bottom of the product.

In a product 30 obtained by triple co-extrusion, the inner liquid heart 31a is completely surrounded by another component 31b such as aerated frozen confection and this component 31b is completely surrounded by a third component 31c.

Instead of a liquid filling such as a sauce, the product may as well consist of an aerated frozen confection filling surrounded by another aerated frozen confection product.

In another preferred embodiment of the product 30, the inner part 31a may as well be aerated frozen confection surrounded by a liquid component 31b such as sauce and this component may be surrounded by an additional component 31c such as aerated frozen confection.

Further, the product 30 can be of different shape according to the shape of the nozzles 4 and the design of the nozzle teeth. Thus, the product can have different geometrical shapes, for example a triangular or squared.

In addition, the product obtained can also be used as decoration on wafers, mini bars, cakes or the like which the product can be dosed upon.

Furthermore, the components of the product are not restricted to the above described components. The product may as well have a more solid inclusion 31a and an aerated frozen confection surrounding 31b, 31c. It may as well have a more solid surrounding 31b, 31c such as an extrudable biscuit.

Further, in order to provide miniature products, multi-bite sized or cakes, the product size may vary between a preferred volume of 2 and 500 milliliters. More preferably, the volume of the product is between 3 and 20 milliliters.

In addition, especially an aerated frozen confection miniature product of volumes between 2 and 25 milliliters can be obtained with a filling such as a heart of sauce which does not occur at the top or bottom side of the product.

Although the present invention has been described with reference to preferred embodiments thereof, many modifications and alternations may be made by a person having ordinary skill in the art without departing from the scope of this invention which is defined by the appended claims. For example, it is possible to design the core element 2 such that even a triple or more co-extrusion is possible. Therefore, additional supplies and extrusion channels can be provided to the core element 2. The pattern and design of these supplies and extrusion channels can vary in order to meet different requirements of the co-extrusion process.

In addition, the product obtained by the method disclosed is preferably an aerated frozen confection product. However, the method and apparatus are not restricted only to produce aerated frozen confection products but can also be used in other extrudable food areas, such as confectionary food, frozen or non-frozen food, dairy food, pet food, culinary, pastry, pasta food and extrudable cereals.

The invention claimed is:

1. A system for dosing a food product onto a support comprising:
   a dosing device for co-extruding at least two food materials at the same time to form a multi-component food product, the dosing device comprising
   a static core element housing at least a first and a second supply, the first supply having at least one orifice connected to an extrusion channel which is positioned coaxially to an extrusion channel connected to an orifice of the second supply; and
   a cylindrical tube element rotatable relative to and enclosing the core element, having a plurality of apertures distributed over an entirety of a circumference of the tube element, the apertures designed to be selectively brought into a coaxial position to the extrusion channels of the first and second supplies by rotating the cylindrical tube element, allowing a co-extrusion of food materials to be introduced into the first and second supplies of the core element, the first and second supplies in the tube element are cylinders that differ in diameter and are arranged co-parallel to the longitudinal axis of the core element and to each other and perpendicular to the extrusion channels.

2. The dosing system of claim 1, wherein the core element houses a third supply, the third supply has at least one extrusion channel coaxially positioned to the extrusion channels of the first and second supplies, and the extrusion channels differ in diameter such that the extrusion channel of the first supply is placed within the extrusion channel of the second supply which is placed within the extrusion channel of the third supply.

3. The dosing system of claim 1, wherein the lengths of the extrusion channels connected to the first and second supplies is such that an outlet of the extrusion channel connected to the first supply is positioned at a distance (L1) from an outlet of the extrusion channel connected to the second supply.

4. The dosing system of claim 3, wherein the distance (L1) is equal or greater than 1 mm.

5. The dosing system of claim 1, wherein the supplies are horizontally aligned so that the longitudinal axes of the supplies are co-parallel with the longitudinal axis of the core element.

6. The dosing system of claim 1, wherein at least one of the extrusion channels is detachably connected to the orifice of the corresponding supply.

7. The dosing system of claim 1, wherein at least one of the extrusion channels is closed.

8. The dosing system of claim 1, wherein the tube element includes a plurality of apertures located over its circumference such that they can be aligned with at least one of the extrusion channels.

9. The dosing system of claim 8, wherein each aperture of the tube element is equipped with a nozzle, the nozzles being connected to the tube element in a detachable manner or being integrally formed within the tube element.

10. The dosing system of claim 9, wherein the dimension of at least one of the nozzles or the cross section of an opening of the nozzles is different for each nozzle.

11. The dosing system of claim 10, wherein the nozzles comprise teeth of a different shape which project towards the centre axis of the openings.

12. The dosing system of claim 11, wherein the teeth of the nozzles are formed so as to project in the direction of the food product flow dosed by the dosing device.

13. The dosing system of claim 1, wherein delivering means are connected to the first and second supplies of the dosing device for providing a flow of food product to the device, and controlling means for controlling the flow of food product.

14. The dosing system of claim 1, wherein the system comprises a support onto which the food product is dosed, the support being static or relatively movable to the dosing device in a continuous or intermittent manner.

15. The dosing system of claim 14, wherein the support is a conveyor belt.

16. The dosing system of claim 15, wherein the conveyor belt has a chilled surface.

17. The dosing system of claim 14, wherein at least one object is carried by the support.

18. The dosing system of claim 17, wherein the object is selected from the group consisting of a tray, a moulding surface and a food product.

19. The dosing system of claim 1, wherein the system is provided with drive means for rotating the tube element about its longitudinal axis.

20. The dosing system of claim 1, wherein the tube element comprises a plurality of apertures, and the apertures are designed to be selectively brought into a coaxial position to the extrusion channels of the first and second supplies by continuously rotating the cylindrical tube element.

21. The dosing system of claim 20, wherein the tube element allows a continuous co-extrusion of portioned food materials introduced into the first and second supplies of the core element.

22. The dosing system of claim 1, further comprising cylindrical recesses distributed over the circumference of the tube element and aligned with the apertures.

23. The dosing system of claim 1, wherein each of the extrusion channels comprises an outlet at an opposite end of the extrusion channel from the corresponding supply, and the extrusion channel of the first supply extends perpendicularly from the first supply through one side of the second supply to an opposite side of the second supply and into the extrusion channel of the second supply such that the second supply is between the first supply and the outlet of the extrusion channel of the first supply, in a radial direction relative to the longitudinal axis of the core element.

24. The dosing system of claim 1, wherein the extrusion channel of the first supply extends through the orifice in the second supply.

* * * * *